United States Patent
Stenström

(10) Patent No.: US 7,350,032 B2
(45) Date of Patent: Mar. 25, 2008

(54) CACHE COHERENCY PROTOCOL INCLUDING GENERIC TRANSIENT STATES

(75) Inventor: Per O. Stenström, Gothenburg (SE)

(73) Assignee: Sun Microsystems, Inc., Santa Clara, CA (US)

( * ) Notice: Subject to any disclaimer, the term of this patent is extended or adjusted under 35 U.S.C. 154(b) by 390 days.

(21) Appl. No.: 10/831,793

(22) Filed: Apr. 26, 2004

(65) Prior Publication Data

US 2005/0210203 A1   Sep. 22, 2005

Related U.S. Application Data

(60) Provisional application No. 60/555,262, filed on Mar. 22, 2004.

(51) Int. Cl.
*G06F 12/00* (2006.01)
(52) U.S. Cl. ........................ 711/144; 711/141; 707/201
(58) Field of Classification Search ................. 711/144
See application file for complete search history.

(56) References Cited

U.S. PATENT DOCUMENTS

| | | |
|---|---|---|
| 5,274,787 A | 12/1993 | Hirano et al. |
| 5,822,763 A * | 10/1998 | Baylor et al. ................ 711/141 |
| 5,892,970 A | 4/1999 | Hagersten |
| 6,088,768 A | 7/2000 | Baldus et al. |
| 6,101,420 A | 8/2000 | VanDoren et al. |
| 6,108,752 A | 8/2000 | Van Doren et al. |
| 6,209,065 B1 | 3/2001 | Van Doren et al. |
| 6,249,846 B1 | 6/2001 | Van Doren et al. |
| 6,272,603 B1 * | 8/2001 | Arimilli et al. ............. 711/146 |
| 6,279,084 B1 * | 8/2001 | VanDoren et al. .......... 711/141 |
| 6,363,458 B1 | 3/2002 | Park |
| 6,526,481 B1 * | 2/2003 | Shen et al. ................. 711/147 |
| 6,631,401 B1 | 10/2003 | Keller et al. |
| 6,925,537 B2 * | 8/2005 | Barroso et al. ............. 711/141 |
| 6,973,545 B2 * | 12/2005 | Cypher ....................... 711/141 |
| 2003/0046495 A1 | 3/2003 | Venkitakrishnan et al. |
| 2003/0097529 A1 | 5/2003 | Arimilli et al. |
| 2004/0024925 A1 | 2/2004 | Cypher et al. |

FOREIGN PATENT DOCUMENTS

WO   2004/104794   12/2004

OTHER PUBLICATIONS

Combined Search and Examination Report under Sections 17 and 18(3), Application No. GB0418820.7, mailed Dec. 10, 2004, 8 pages.
Culler, et al., "Parallel computer architectureHardware/Software Approach," 1999, pp. 385-388.
International Search Report and Examination Report from UK Patent Application No. 0605773.1, mailed Jun. 19, 2006, 6 pages.

* cited by examiner

*Primary Examiner*—Donald A. Sparks
*Assistant Examiner*—Hashem Farrokh
(74) *Attorney, Agent, or Firm*—Lawrence J. Merkel; Meyertons, Hood, Kivlin, Kowert & Goetzel, P.C.

(57) ABSTRACT

In one embodiment, a cache comprises a cache memory and a cache control circuit coupled to the cache memory. The cache memory is configured to store a plurality of cache blocks and a plurality of cache states. Each of the plurality of cache states corresponds to a respective one of the plurality of cache blocks. The cache control circuit is configured to implement a cache coherency protocol that includes a plurality of stable states and a transient state The transient state may be used in response to any request from a local consumer if completing the request includes a change between the plurality of stable states and making the change includes transmitting at least a first communication to maintain coherency on an interconnect.

34 Claims, 8 Drawing Sheets

| Current State | Event | | | | | | | Next State |
|---|---|---|---|---|---|---|---|---|
| | Local Read | Local Write | Coherency Point | Global Read | Global RdX/ Upgrade | Reply (NewState) | Unlock (ReqType) | |
| M | M | M | - | GT_G | GT_G | - | - | |
| E | E | M | - | GT_G | GT_G | - | - | |
| S | S | GT_L | - | GT_G | GT_G | - | - | |
| I | GT_L | GT_L | - | GT_G | GT_G | - | - | |
| GT_L | - | - | - | GT_G | GT_G | NewState | - | |
| GT_G | - | - | - | - | - | - | dep. on ReqType | |

Fig. 3

Computer Accessible Medium 200

Software 202

Fig. 9

CACHE COHERENCY PROTOCOL INCLUDING GENERIC TRANSIENT STATES

This application claims benefit of priority to U.S. Provisional Patent Application Ser. No. 60/555,262, filed Mar. 22, 2004, which is incorporated herein by reference in its entirety.

BACKGROUND OF THE INVENTION

1. Field of the Invention

This invention is related to the field of cache coherency.

2. Description of the Related Art

Computer systems often employ one or more caches to provide low latency access to blocks stored therein, as compared to the latency to access main memory. If multiple caches are employed, and the caches may independently store the same cache block for access and potential modification by different local consumers (such as processors coupled to the cache), the issue of cache coherence arises.

Various cache coherency protocols have been devised to maintain cache coherency. Typically, the cache coherency protocol specifies a set of states that a given cache block may have when stored in the cache. Additionally, the cache coherency protocol specifies transitions between the states, as well as any communications with other caches used to change states of other copies of the same cache block. In a given state, a given access (e.g. read or write) either may be permitted without state change or may require a state change. In some cases, the state change may require communication between the caches as mentioned above. In these cases, a state change from one stable state to another cannot be performed atomically since the communication must also be transmitted to other caches, and those caches may also need to make a state change.

When a state change is required to permit an access to a cache, and the state change also requires a communication, transient states are introduced to the cache coherency protocol. Transient states are entered when a cache access occurs that requires a state change in other caches. Transitions from the transient state to the new state required for the access occur when the communication has been ordered with respect to other possible communications at all caches. A different transient state is provided for each possible case of a state change being required in another cache.

The transient states are provided to resolve race conditions in the cache coherency protocol. Since the caches operate independently to respond to accesses from their local consumers (e.g. processors), accesses in different caches to the same cache block may occur at approximately the same time and may require communications (global state changes) to complete. One of the communications from one of the caches will effect a state change before the others. Thus, a given communication to effect a state change may not occur successfully prior to other communications affecting the underlying cache block.

FIG. 1 is a block diagram illustrating an example of the popular Modified, Exclusive, Shared, and Invalid (MESI) cache coherency protocol for a system in which caches are coupled via a bus (on which snooping is performed) and the local consumers are processors. In the MESI protocol, there are four stable states: M, E, S, and I. The M state indicates that the cache block has been modified in the cache. The E state indicates that the cache block has not been modified in the cache, but no other cache has a copy and thus a modification in the cache is permissible without any communication with other caches. The S state indicates that the cache block is (or was at some previous time) shared with at least one other cache. That is, another copy of the cache block may be stored in another cache if the cache block is in the S state. Thus, the copy may be read but not modified without a bus transaction to invalidate other shared copies. The I state indicates that the cache block is not valid in the cache.

There are also three transient states in FIG. 1: I->S, E; S->M; and I->M. The transient states each indicate the current state from which a transition is occurring for the cache block and the new state to which the transition is to complete. That is, the transient state I->M indicates a transition from the invalid state to the modified state. Similarly, the transient state S->M indicates a transition from the shared state to the modified state. The transient state I->S, E indicates a transition from the invalid state to either the shared state or the exclusive state (dependent on a response to the bus transaction initiated for the state change).

In FIG. 1, the current state of a cache block is shown to the left of heavy line 10. Above another heavy line 12, various events that may affect the current state are shown. Below heavy line 12 and to the right of heavy line 10 is a table of various cache states. The state in the table at the intersection of a current state and an event is the next cache state for a cache block in the current state if the event occurs to that cache block. A dash in the table indicates that no state change occurs for that event/current state combination. The events include a processor read, a processor write, a bus grant for the transaction required to complete a state change, a bus read (a read from the bus initiated by another cache or bus device) and a bus read exclusive/upgrade (initiated to obtain a modified state in the source's cache). In this example, the bus is the point at which transactions from different sources are ordered. Thus, a bus grant to perform a transaction may be enough to know that the state change in other caches in response to that transaction will be committed before any new transactions are transmitted on the bus.

For the stable states in FIG. 1, state transitions to another stable state or to a transient state occur in response to processor reads and writes. Also, for the stable states, transitions occur to other stable states in response to bus read transactions and bus read exclusive/upgrade transactions received from the bus. For the transient states, transitions occur to a stable state when the bus grant for the corresponding transaction occur. In the case of the transient state I->S, E, the stable state is either shared (if the snoop response (SR) to the transaction on the bus is shared) or exclusive (if the SR is not shared). Additionally, for the S->M transient state, a transition to the I->M transient state occurs if a bus read exclusive/upgrade occurs to the cache block (since the cache block is invalidated in the cache in response to the transaction).

The inclusion of the various transient states complicates the design and verification of devices that implement the cache coherency protocol. Particularly, it is often the transient states that are the source of incorrect coherence functionality in a design. As designs and/or cache coherency protocols become more complex, the number of corner cases and/or potential race conditions generally increases, increasing the number of transient states.

SUMMARY OF THE INVENTION

In one embodiment, a cache comprises a cache memory and a cache control circuit coupled to the cache memory.

The cache memory is configured to store a plurality of cache blocks and a plurality of cache states. Each of the plurality of cache states corresponds to a respective one of the plurality of cache blocks. The cache control circuit is configured to implement a cache coherency protocol that includes a plurality of stable states and a transient state The transient state may be used in response to any request from a local consumer if completing the request includes a change between the plurality of stable states and making the change includes transmitting at least a first communication to maintain coherency on an interconnect.

In another embodiment, a cache comprises a cache memory and a cache control circuit coupled thereto. Responsive to a request from a local consumer that accesses a first cache block of the plurality of cache blocks in the cache memory, wherein a first cache state of the plurality of cache states corresponds to the first cache block, the cache control circuit is configured to change the first cache state to a transient state if: (i) a change from a current state to a new state is to be performed responsive to the request, and (ii) performing the change from the current state to the new state includes performing at least a first communication on an interconnect to maintain coherency of the first cache block. The same transient state is used in response to any request from a local consumer for changing from any current state to any new state if the change includes at least one communication on the interconnect.

In yet another embodiment, a cache comprises a cache memory and a cache control circuit coupled to the cache memory. Responsive to a first communication from an interconnect separate from one or more local consumers, the cache control circuit is configured to change a first cache state of a plurality of cache states in the cache memory from a current stable state to a transient state. The first cache state corresponds to a first cache block of the plurality of cache blocks in the cache memory and is identified by the global request.

BRIEF DESCRIPTION OF THE DRAWINGS

The following detailed description makes reference to the accompanying drawings, which are now briefly described.

FIG. 3 is a block diagram of one embodiment of a cache coherency protocol.

FIG. 9 is a block diagram of one embodiment of a computer accessible medium.

Figure 1:
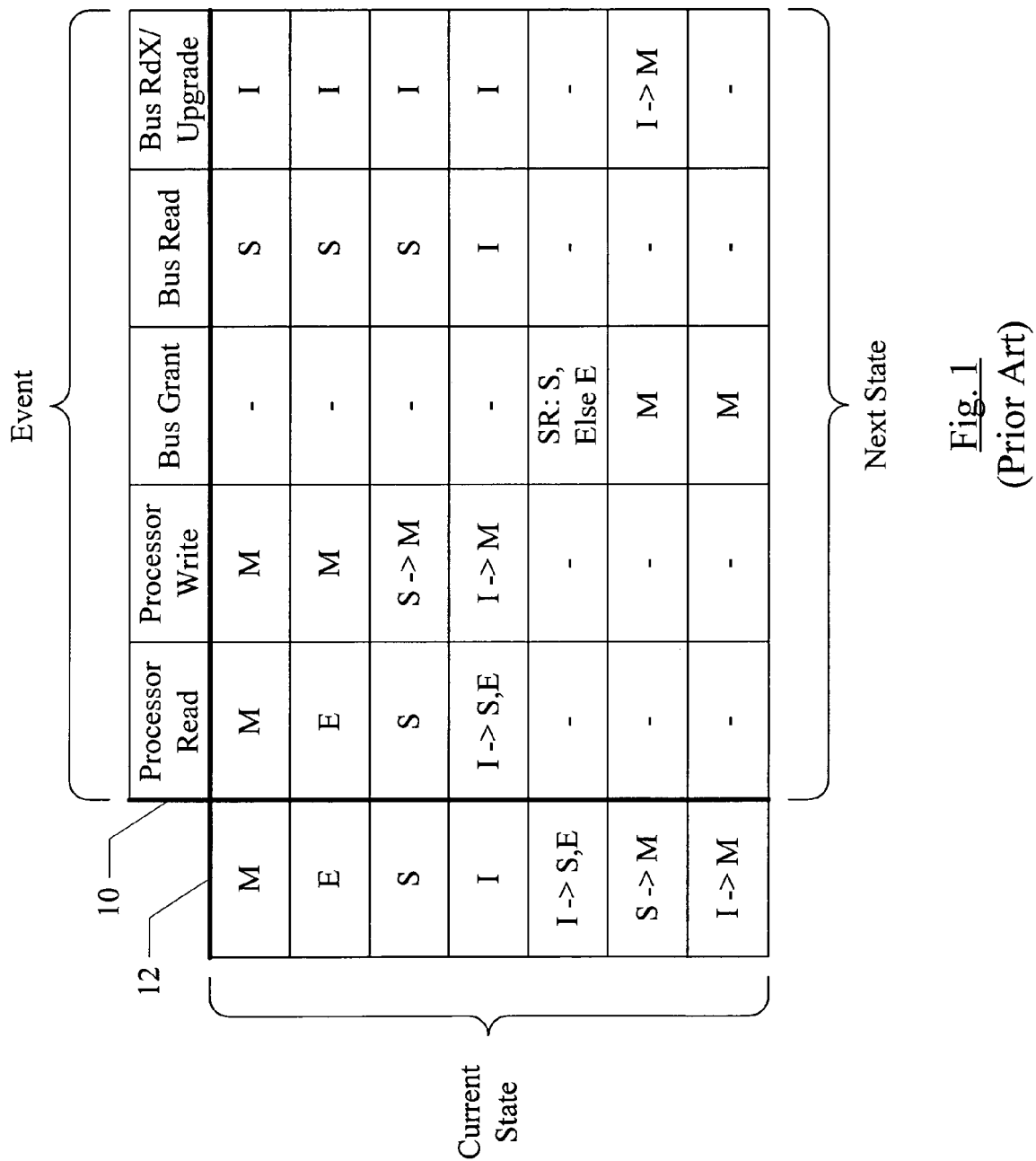
FIG. 1 is a block diagram of a prior art cache coherency protocol.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Figure 2:
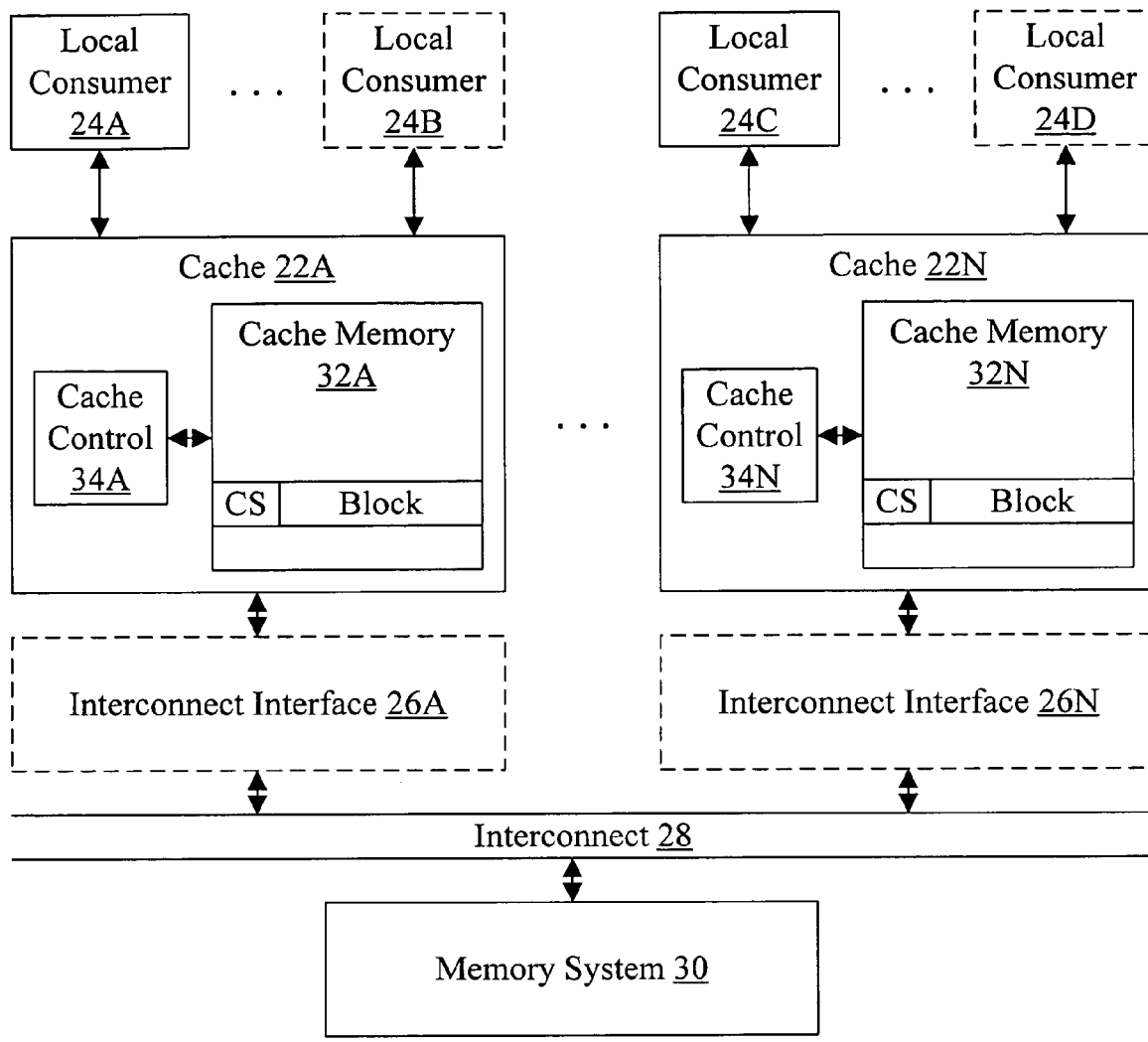
FIG. 2 is a block diagram of one embodiment of a system including caches.

Turning now to FIG. 2, a block diagram of one embodiment of a system 20 is shown. In the illustrated embodiment, the system 20 includes a plurality of caches (e.g. caches 22A-22N in FIG. 2). Each cache 22A-22N is coupled to at least one local consumer. For example, cache 22A has a local consumer 24A and may optionally have additional local consumers such as local consumer 24B. Cache 22N has a local consumer 24C and may optionally have additional local consumers such as local consumer 24D. Each cache 22A-22N may further optionally be coupled to a respective interconnect interface unit 26A-26N, which is coupled to an interconnect 28. In other embodiments, the caches 22A-22N may directly interface to the interconnect 28, if desired. That is, the functionality of the interconnect interface units 26A-26N may be incorporated into the respective caches 22A-22N. A memory system 30 is further coupled to the interconnect 28. In the illustrated embodiment, each cache 22A-22N may comprise a cache memory (e.g. cache memories 32A and 32N in FIG. 2) coupled to a respective cache control circuit (e.g. cache control circuits 32A and 32N in FIG. 2).

Generally, the caches 22A-22N may be configured to cache blocks of data from the memory system 30 for access by the corresponding local consumers 24A-24D. In the context of caching data from memory, the term "data" is being used in its generic sense to refer to either data or instructions for execution. The cache memories 32A-32N each comprise a plurality of entries, where each entry is capable of storing a cache block. Additionally, each entry may store a state of the cache block, as well as any other information (e.g. an address tag for the cache block, replacement algorithm data such as least recently used state, etc.). In FIG. 2, an exemplary entry is illustrated in each of cache memories 32A-32N with a cache block ("Block" in FIG. 2) and a cache state ("CS" in FIG. 2) shown.

The caches 22A-22N (and more particularly the cache control circuits 34A-34N in the embodiment of FIG. 2) implement a cache coherency protocol that includes a set of stable states as well as at least one generic transient state. One embodiment includes two generic transient states: a local generic transient state and a global generic transient state. The generic transient state(s) may be used for any change between stable states that also includes a communication to other caches (and thus may not be performed atomically). For example, the communication may be a "promotion request" that informs other caches of the initiating cache's desire to move to a higher (more permissive) cache state in the cache coherency protocol. Promotion requests may be encoded in different fashions, depending on the interconnect. For example, read requests, read exclusive requests, upgrade requests, invalidate requests, etc. may be examples of promotion requests in various embodiments. The use of generic transient state(s) may simplify the cache coherency protocol in some embodiments, which may reduce the design and verification complexity.

The local generic transient state may be used to handle any state changes caused by a local request that involve a transient state. That is, the local generic transient state may be a generic mechanism to handle any corner cases/race conditions in the cache coherency protocol. A cache 22A-22N may enter the local generic transient state for a cache block responsive to a local request to the cache block from one of its local consumers if the local request and the cache block's current state in the cache cause a communication on the interconnect 28 to complete the local request according to the implemented cache coherency protocol. The cache 22A-22N may initiate the communication for the interconnect 28 (e.g. to change the cache state in other caches). The reply to the communication from the interconnect 28 may be encoded with the final cache state for the cache block. In response to the reply, the cache 22A-22N may transition from the local generic transient state to the final state specified in the reply. In some embodiments, the caches 22A-22N that receive a communication from a cache on the interconnect 28 (e.g. a promotion request) may update to stable states in response to the communication. In other embodiments, the global generic transient state may be used.

The global generic transient state may be used as a generic transient state entered by a cache 22A-22N for a cache block in response to receiving a communication to the cache block from the interconnect 28. The communication is initiated by another cache 22A-22N that has entered the local generic transient state for the cache block. The global generic transient state, in some embodiments, may be used to effectively lock the coherence state of the caches. In such embodiments, a cache in the local generic transient state, after receiving the reply mentioned above, may transmit a second communication (an "unlock" communication, in the present embodiment) on the interconnect 28. The unlock communication may indicate that the other caches 22A-22N may leave the global generic transient state (that is, the unlock communication may indicate that the state change is complete). In some embodiments, the unlock communication may include the type of the original communication, and the change from the global generic transient state may be dependent on the type. In other embodiments, the encoding of the cache state in the entries may permit the global generic transient state to also record the previous stable state, to guide the new state to which the cache state is changed from the global generic transient state. Additional details regarding the cache coherency protocol including generic transient state(s) are provided below.

The form of the communications on the interconnect 28 may be dependent on the implementation of the interconnect 28. For example, if the interconnect 28 comprises a bus, the communications may be transactions on the bus. If the interconnect 28 is a packet-based interconnect, the communications may be packets. Generally, a communication may identify the cache block that is affected by the communication. For example, the communication may include the address of the cache block in the memory system 30.

As mentioned above, the caches 22A-22N may each be coupled to one or more local consumers (e.g. the cache 22A may be coupled to the local consumers 24A-24B, and the cache 22N may be coupled to the local consumers 24C-24D). The local consumers 24A-24D may be coupled to their caches 22A-22N separately from the interconnect 28. The local consumers 24A-24D generate requests (e.g. read and write requests) to access the caches 22A-22N and receive/transmit corresponding data to the caches 22A-22N. Generally, each request includes an address of the data being accessed, identifying the cache block affected by the request. A request may be referred to as being "to a cache block" or "accessing a cache block" if the address of the request identifies data within the cache block. As used herein, a "local consumer" may comprise any circuitry configured to transmit requests to a cache. Local consumers may include processor cores (e.g. if the caches 22A-22N are integrated onto a semiconductor substrate with the cores), processors, higher level caches in a cache hierarchy (where a higher level is a level closer to the consumers such as processors), etc.

Each cache memory 32A-32N may comprise one or more memories. For example, in some embodiments, a tag memory may be implemented to store the cache state, address tag, etc. and a data memory may be implemented to store the cache blocks. Other embodiments may divide the cache information between the memories in any other desired fashion. Other embodiments may use one memory for both the cache blocks and the corresponding cache state, address tag, etc. Still other embodiments may use more than two memories, and may divide the information stored therein as desired. In various embodiments, the cache memories 32A-32N may have any configuration (e.g. set associative, fully associative, or direct-mapped implementations of the caches 22A-22N). The cache control circuits 34A-34N comprise any circuitry used to implement the cache coherency protocol. The cache control circuits 34A-34N may further comprise circuitry to implement other cache functions (e.g. responding to local requests, allocating cache entries for local requests that miss in the cache, etc.). In other embodiments, the cache control circuits 34A-34N may be implemented in software executed by a processor. In still other embodiments, the cache control circuits 34A-34N may be implemented in a combination of software and hardware circuitry. The software may be stored on a computer accessible medium. For example, FIG. 9 illustrates one embodiment of a computer accessible medium 200 storing software 202 that may implement the cache control operations described herein for the cache control circuits 34A-34N, including the cache coherency protocol. That is, the software 202 may comprise a plurality of instructions which, when executed, implement the cache control operations. Generally speaking, a computer accessible medium may include any media accessible by a computer during use to provide instructions and/or data to the computer. For example, a computer accessible medium may include storage media such as magnetic or optical media, e.g., disk (fixed or removable), tape drives, compact disk-ROM (CD-ROM), or digital versatile disk-ROM (DVD-ROM), CD-Recordable (CD-R), CD-Rewritable (CD-RW), DVD-R, DVD-RW, volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc., as well as media accessible via transmission media or signals such as electrical, electromagnetic, or digital signals, conveyed via a communication medium such as a network and/or a wireless link.

As used herein, the term "cache block" refers to the unit of allocation and deallocation of storage in the caches. Cache blocks may be of any desired size in various embodiments. For example, cache block sizes of 32 bytes and 64 bytes are common, although larger or smaller sizes may be used. In some embodiments, cache coherency is also maintained on a cache-block granularity, although smaller granularities may be used (e.g. a cache block may be divided into two or more sectors, and cache coherency may be maintained on a sector granularity). Each cache block in the cache may have an associated cache state. The cache state (or more briefly "state") is one of the states defined in the cache coherency algorithm, and may indicate which requests are permitted to the cache block without communicating with other caches (e.g. read, write, etc.). A "stable cache state" (or more briefly a "stable state") may refer to a cache state which, once established in the cache, remains the same until one of the following events occurs: receipt of a local request that causes a state change, receipt of a global request initiated by another cache that causes a state change, or the corresponding block is invalidated (e.g. due to replacement in the cache). A "transient cache state" (or more briefly "transient state") may refer to a cache state that is entered from one stable state in order to subsequently change to a different stable state after at least one communication with other caches is performed.

The interconnect interface units 26A-26N may interface between the caches 22A-22N and the interconnect 28. The interconnect interface units 26A-26N may include circuitry that implements the communication protocol on the interconnect 28. Additionally, the interconnect interface units 26A-26N may include various queues to queue communications initiated by the caches 22A-22N and/or to queue communications received from the interconnect 28 for the caches 22A-22N.

The interconnect 28 may be any type of communication medium. For example, in some embodiments, the interconnect 28 may comprise a bus on which transactions may be initiated. In other embodiments, the interconnect 28 may comprise a packet-based interconnect on which packets are transmitted/received. The interconnect 28 may be a point-to-point interconnect in a packet-based embodiment, for example, or any other interconnect structure. In still other embodiments, the interconnect 28 may have a hierarchical structure including local interconnects of any desired type and a global interconnect to communicate between the local interconnects. The global interconnect may itself be hierarchical as well. At each level of the hierarchy, circuitry may be included to interface between the levels, similar to the interconnect interface units 26A-26N. In yet other embodiments, the interconnect 28 may be comprise a circuit-switched network or a packet-switched network.

The memory system 30 may comprise any type of memory, and may also include a memory controller to interface to the memory. For example, dynamic random access memory (DRAM), synchronous DRAM (SDRAM), double data rate (DDR) SDRAM, etc. may be used. The memory system 30 may be a distributed memory system, in some embodiments. Various peripheral devices (e.g. storage devices such as disk drives, printers, networking devices, etc.) may be included in various embodiments of a system as well.

Turning now to FIG. 3, a block diagram is shown illustrating one embodiment of the MESI cache coherency protocol for the system 20, using the local and global generic transient states described above. In FIG. 3, the current state of a cache block is shown to the left of heavy line 40. The current states include the stable states (e.g. M, E, S, and I for this example) and the local and global generic transient states. The local generic transient state is labeled GT_L in FIG. 3, and the global generic transient state is labeled GT_G in FIG. 3. Above another heavy line 42, various events that may affect the current state are shown. Below heavy line 42 and to the right of heavy line 40 is a table of various cache states. The state in the table at the intersection of a current state and an event is the next cache state for a cache block in the current state if the event occurs to that cache block. A dash in the table indicates that no state change occurs for that event/current state combination. The events include a local read, a local write, a coherency point for a communication issued on the interconnect 28 to complete a state change, a global read, a global read exclusive/upgrade, a reply, and an unlock.

The local read and local write events may be read and write requests from the local consumers of the cache, respectively. If the current state of the cache block accessed by the request is M or E, the next state of the cache block is a stable state for both local reads and local writes. If the current state is S, the next state is a stable state for local reads as well. If the current state is S and a local write occurs, or for a local read or a local write if the current state is I, then the next state is the local generic transient state GT_L. Local reads and local writes to a cache block already in one of the generic transient states do not cause state transitions. In some embodiments, local reads and local writes to a cache block in one of the generic transient states may be stalled until the state change is complete.

In this embodiment, no state changes occur at the coherency point of a communication issued to complete a state change ("coherency point" event in FIG. 3). The coherency point may vary in different embodiments. For example, for a shared bus, the grant of the bus to perform the transaction, or the successful transmission of the transaction on the bus, may be the coherency point. For packet-based interconnects, the coherency point may be the memory controller that owns the cache block, or another coherency management point defined for the interconnect (e.g. a directory in the home node of the cache block for directory-based coherency mechanisms).

The global read event and the global read exclusive/upgrade event (Global RdX/Upgrade in FIG. 3) may refer to communications received by a cache from the interconnect 28. The global read may be a request for at least a shared copy of a cache block, and the global read exclusive/upgrade request may be a request to transition to the modified state. Any communication received by the cache from the interconnect 28 that is initiated by another cache to complete a state change in the other cache may be referred to as a "global request" herein. Dependent on the cache coherency protocol, the number and type of global requests may vary. Generally, for any global request to a cache block, the next state of the cache block is the global generic transient state (GT_G) unless the current state is already the global generic transient state.

On the other hand, if the current state of the cache block is the global generic transient state and a global request to the cache block is received, a previous global request to the cache block is in progress and the next state remains the global generic transient state. Since a previous global request is not complete, the cache may reply to the received global request on the interconnect 28 with a non-acknowledgement reply (NAK). The NAK reply generally causes the corresponding global request to be cancelled and reattempted later by the source of the global request. The form of the NAK reply may vary dependent on the definition of the interconnect. For example, on a bus, a retry signal (also referred to by other names such as an ignore signal) may be defined that may be asserted in response to a transaction to cancel the transaction on the interconnect. For packet-based interconnects, the NAK reply may be a packet returned in response to a global request packet. Accordingly, since local requests to a cache block in the global generic transient state are stalled and global requests to a cache block in the global generic transient state receive a NAK reply, the global generic transient state may be used to effectively lock a cache block (preventing access to the cache block) until the state change for the cache block is completed.

A reply communication corresponding to a global request may be provided on the interconnect 28. The reply communication may indicate the new state that the cache block is to have in the source of the global communication. That is, the new state may be encoded in the reply communication. In some embodiments, the reply communication may include the cache block (e.g. if the global request was a read). The reply communication to an upgrade (if no data is to be returned) may be an indication that the upgrade has been accepted by the other caches on the interconnect 28 (e.g. the other caches have changed to the global generic transient state for the cache block). The cache that initiated the global request may receive the reply communication from the interconnect 28, and may change the state of the corresponding cache block from the local generic transient state (GT_L) to the new state encoded in the reply communication (NewState in FIG. 3). The reply communication may apply to cache blocks having the local generic transient state, and thus other states are unaffected by receipt of a reply communication to the cache block.

Finally, the cache that initiated the global request may transmit an unlock communication on the interconnect 28. The unlock communication may identify the affected cache block (e.g. by address), and may also indicate the next state for caches that have the cache block in the global generic transient state. For example, the unlock communication may include the request type of the global request and the next state may be dependent on the request type (e.g. the next state may be invalid for global read exclusive/upgrade requests and the next state may be shared for global read requests). In other embodiments, the next state may be encoded in the unlock communication, or the cache state encoding stored in the cache may be capable of storing the next state in addition to indicating that the current state is the global generic transient state. In response to the unlock communication, caches having the cache block in the global generic transient state change to the state indicated by the unlock communication.

In some embodiments, if a cache has an outstanding request pending for the cache block affected by the unlock communication, the cache may not change from the global transient state to the next state as described above. Instead, the cache may change to the local generic transient state (GT_L). Such operation may handle the case in which the cache had the local generic transient state for the cache block prior to changing to the global generic transient state. The outstanding request from the cache, if previously attempted, would have received a NAK reply. The request may subsequently be reattempted.

While the MESI cache coherency protocol is shown in the embodiment of FIG. 3, any cache coherency protocol may be used in other embodiments and may use the generic transient states to handle any transient states in that cache coherency protocol. That is, any set of stable cache state definitions may be used, with transient states handled using the generic transient states described above. For example, the MOESI protocol (where the "O" state is the owned state, in which the cache is responsible for cache block and returning it to memory even though the modified contents of the cache block may be shared with other caches), the MSI protocol, the MOSI protocol, etc. may be used. In other embodiments, directory-based cache coherency protocols may be used, and the directories may implement the generic transient state(s).

Figure 4:
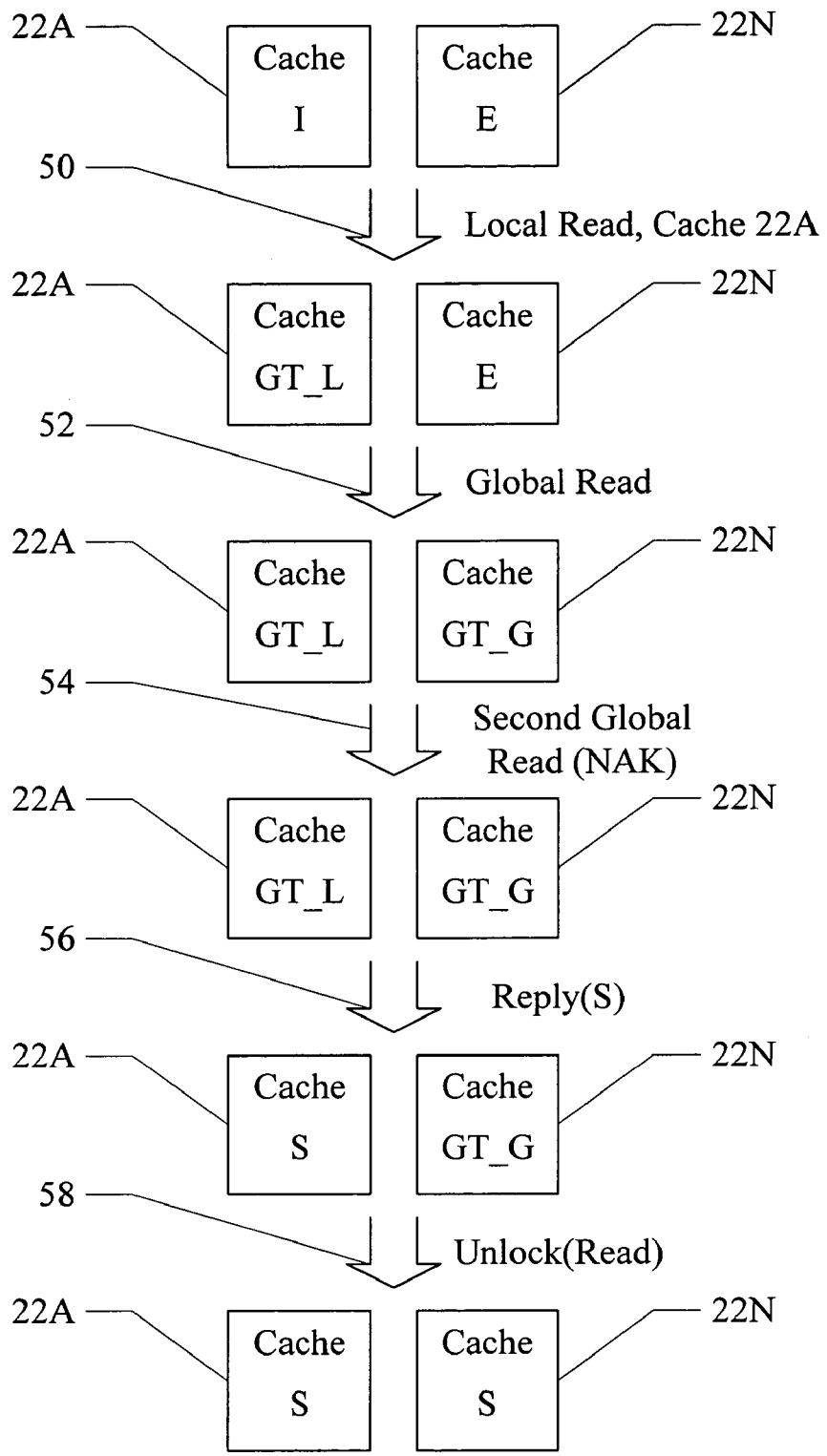
FIG. 4 is an example of the cache coherency protocol illustrated in FIG. 3.

Turning now to FIG. 4, an example using the MESI cache coherency protocol shown in FIG. 3 is shown. The caches 22A and 22N are shown, along with the indication of the state of a cache block in the caches at each point in the example. Various events that occur in the example are shown next to arrows between the caches. The resulting states in the caches 22A and 22N for each event are illustrated at the head of the corresponding arrow.

Initially, the cache block affected by the example is in the invalid (I) state in cache 22A and in the exclusive (E) state in cache 22N. The cache 22A receives a local read request from one of its local consumers 24A-24B (arrow 50), and the cache 22A changes to the local generic transient state (GT_L). The cache 22A initiates a global read request to the cache block on the interconnect 28 (arrow 52). The cache 22N receives the global read request and changes the state of the cache block to the global generic transient state (GT_G).

In this example, a second global read request is received (arrow 54). For example, the second global read request may have been initiated by a cache that was in the invalid state prior to the global read request from cache 22A. The cache 22N, being in the GT_G state, NAK replies to the second global read request. No state changes occur in the caches 22A-22N.

A reply communication corresponding to the global read request occurs (arrow 56). In this example, the reply indicates the shared (S) state for the cache block in the cache 22A, since the cache 22N had the E state prior to the global read request. The cache 22A changes from the GT_L state to the S state in response to the reply. Additionally, the cache 22A transmits an unlock communication for the cache block, indicating that the request type was a read (arrow 58). The cache 22N changes from the GT_G state to the S state for the cache block responsive to the unlock communication.

Figure 5:
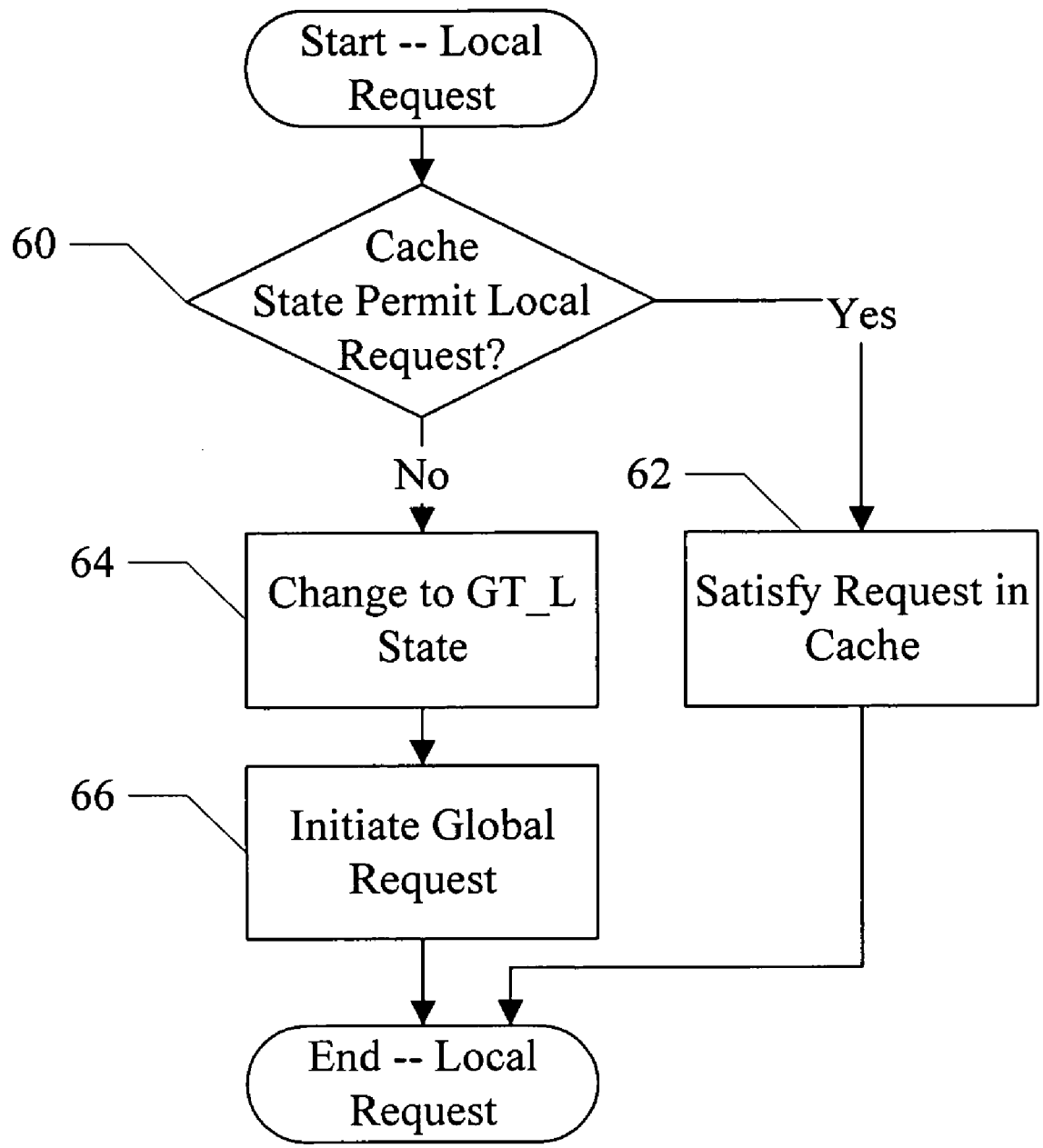
FIG. 5 is a flowchart illustrating operation of one embodiment of a cache control circuit in response to a local request.

Turning next to FIG. 5, a flowchart is shown illustrating operation of one embodiment of a given cache 22A-22N (and more particularly the cache control circuit 34A-34N in that cache) in response to a local request. While the blocks are shown in a particular order to ease understanding, other orders may be used. Furthermore, the blocks may be performed in parallel by combinatorial logic circuitry in the cache control circuit. In other cases, a block or blocks may be pipelined over multiple clock cycles, if desired.

The cache control circuit may receive the state of the cache block accessed by the local request from the corresponding cache memory, and may determine if the cache state permits the local request to occur in cache (decision block 60). The cache state permits the local request to occur in cache if either no state change occurs in response to the local request or if the state change can be performed without initiating a communication on the interconnect 28. If the local request may occur in cache (decision block 60, "yes" leg), the cache control circuit may satisfy the local request (block 62). If the local request may not occur in cache (decision block 60, "no" leg), the cache control circuit may change the cache state to the local generic transient state (block 64), and may initiate a global request to complete the state change to the state the permits the local request to complete (block 66).

Figure 6:
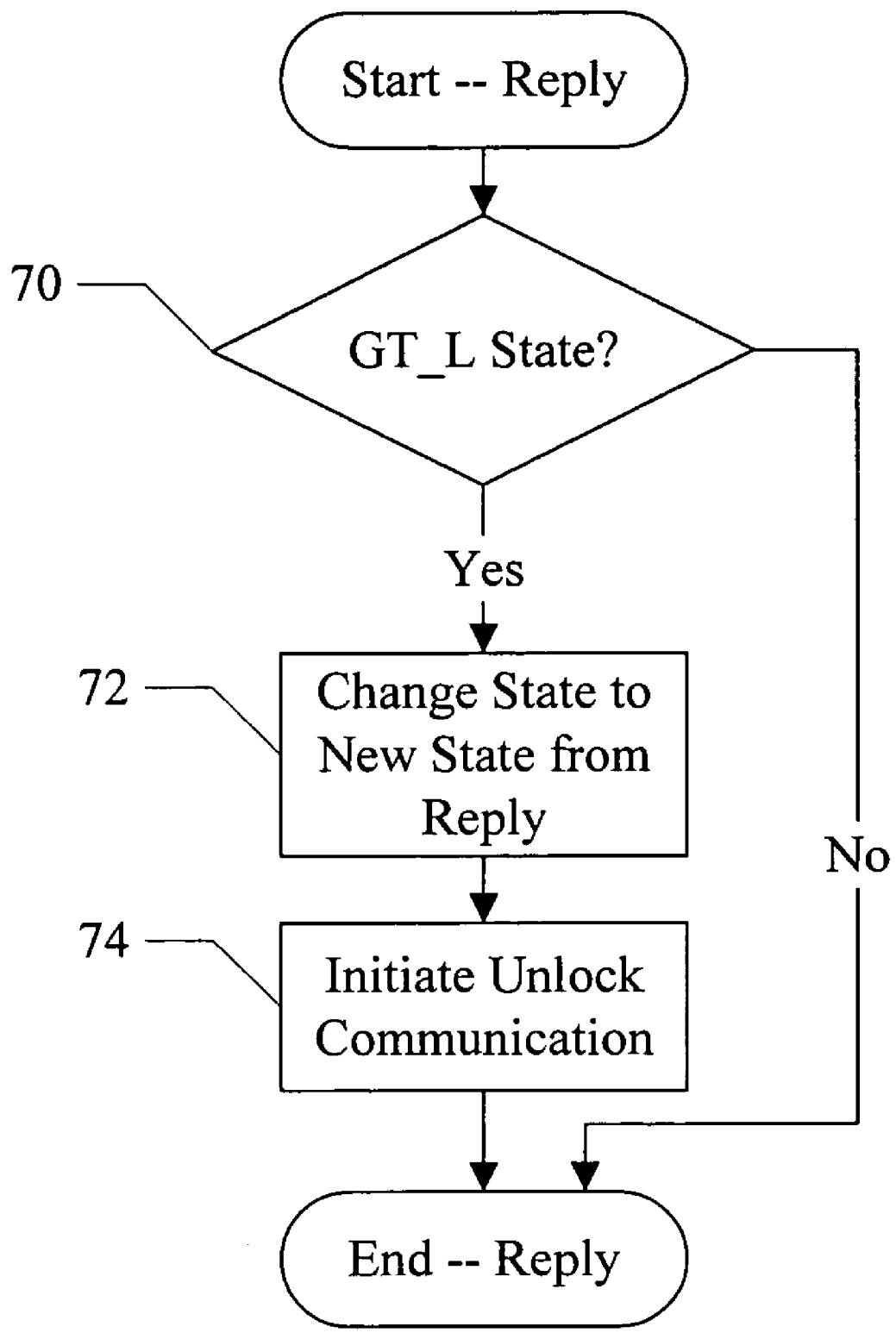
FIG. 6 is a flowchart illustrating operation of one embodiment of a cache control circuit in response to a reply.

Turning next to FIG. 6, a flowchart is shown illustrating operation of one embodiment of a given cache 22A-22N (and more particularly the cache control circuit 34A-34N in that cache) in response to receiving a reply communication. While the blocks are shown in a particular order to ease understanding, other orders may be used. Furthermore, the blocks may be performed in parallel by combinatorial logic circuitry in the cache control circuit. In other cases, a block or blocks may be pipelined over multiple clock cycles, if desired.

The cache control circuit may check to see if the cache block identified by the reply communication is in the local generic transient state (decision block 70). For example, the cache memory may output the state of the cache block in response to the reply communication. Alternatively, state outside the cache memory may be kept for blocks in transient states, if desired. If the cache block is not in the local generic transient state (decision block 70, "no" leg), the reply communication is not for this cache and thus is ignored by the cache control circuit. If the cache block is in the local generic transient state (decision block 70, "yes" leg), the cache control circuit may change the state from the local generic transient state to the new state from the reply communication (block 72), and may initiate the unlock communication (block 74).

Figure 7:
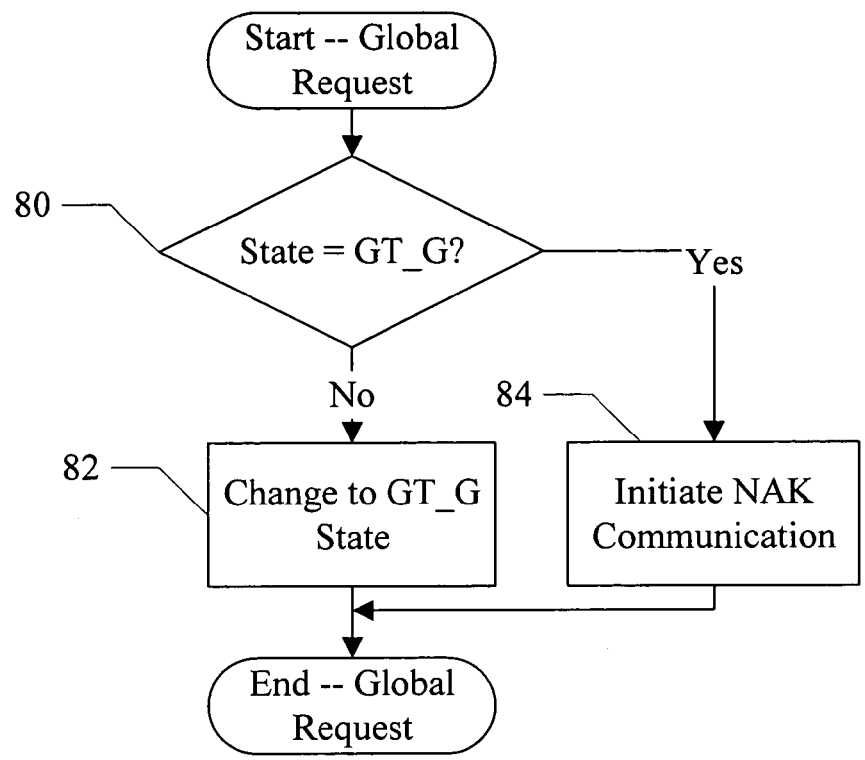
FIG. 7 is a flowchart illustrating operation of one embodiment of a cache control circuit in response to a global request.

Turning next to FIG. 7, a flowchart is shown illustrating operation of one embodiment of a given cache 22A-22N (and more particularly the cache control circuit 34A-34N in that cache) in response to receiving a global request. While the blocks are shown in a particular order to ease understanding, other orders may be used. Furthermore, the blocks may be performed in parallel by combinatorial logic circuitry in the cache control circuit. In other cases, a block or blocks may be pipelined over multiple clock cycles, if desired.

The cache control circuit may receive the state of the cache block accessed by the global request from the corresponding cache memory, and may determine if the cache state is the global generic transient state (decision block 80). Alternatively, state for cache blocks in a transient state may be kept outside of the cache memory, if desired. If the cache block is not in the global generic transient state (decision block 80, "no" leg), the cache control circuit changes the state of the cache block to the global generic transient state (block 82). On the other hand, if the cache block is in the global generic transient state (decision block 80, "yes" leg), the cache control circuit may initiate an NAK communication in response to the global request (block 84).

Figure 8:
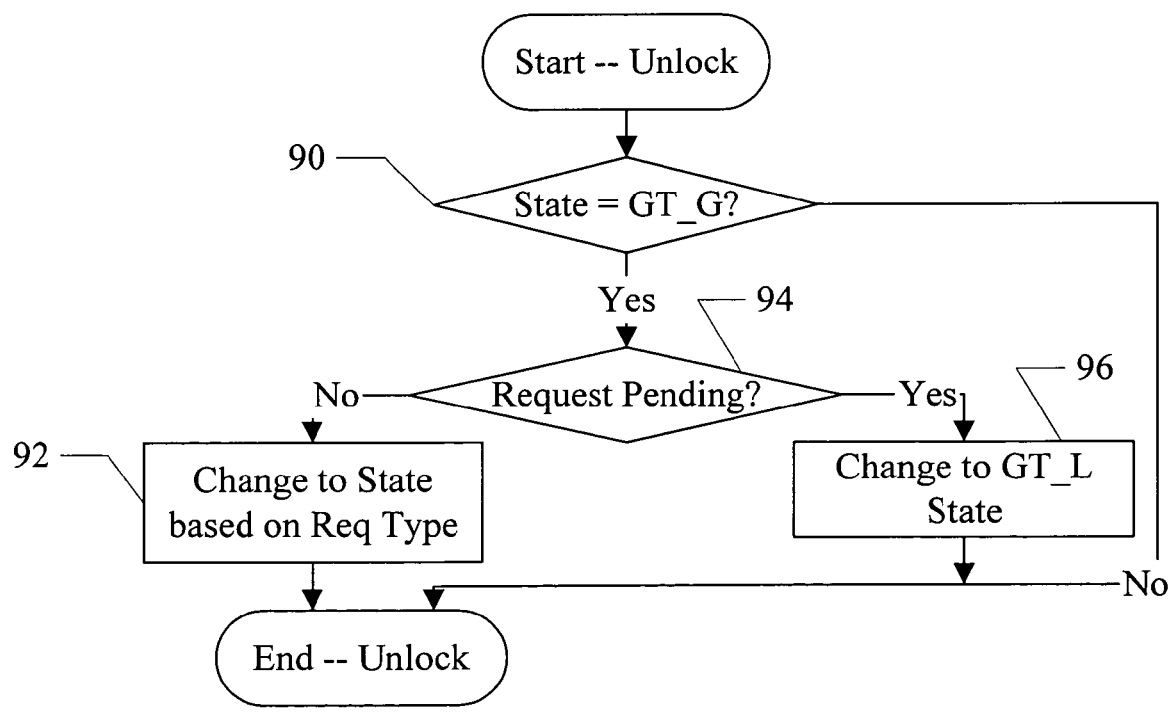
FIG. 8 is a flowchart illustrating operation of one embodiment of a cache control circuit in response to an unlock communication.

Turning next to FIG. 8, a flowchart is shown illustrating operation of one embodiment of a given cache 22A-22N (and more particularly the cache control circuit 34A-34N in that cache) in response to receiving an unlock communication. While the blocks are shown in a particular order to ease understanding, other orders may be used. Furthermore, the blocks may be performed in parallel by combinatorial logic circuitry in the cache control circuit. In other cases, a block or blocks may be pipelined over multiple clock cycles, if desired.

The cache control circuit may receive the state of the cache block indicated by the unlock communication from the corresponding cache memory, and may determine if the cache state is the global generic transient state (decision block 90). Alternatively, state for cache blocks in a transient state may be kept outside of the cache memory, if desired. If the cache block is not in the global generic transient state (decision block 90, "no" leg), the cache control circuit may ignore the unlock communication. On the other hand, if the cache block is in the global generic transient state (decision block 90, "yes" leg), the cache control circuit may determine if there is an outstanding request pending from the cache for the cache block (decision block 94). If there is not a pending request (decision block 94, "no" leg), the cache control circuit may change the state of the cache block from the global generic transient state to the stable state indicated by the request type from the unlock communication (block 92). If there is a pending request (decision block 94, "yes" leg), the cache control circuit may change the state of the cache block to the local generic transient state (block 96).

Numerous variations and modifications will become apparent to those skilled in the art once the above disclosure is fully appreciated. It is intended that the following claims be interpreted to embrace all such variations and modifications.

What is claimed is:

1. A cache comprising:
   a cache memory configured to store a plurality of cache blocks and a plurality of cache states, wherein each of the plurality of cache states corresponds to a respective one of the plurality of cache blocks; and
   a cache control circuit coupled to the cache memory, wherein, responsive to a request from a local consumer that accesses a first cache block of the plurality of cache blocks, wherein a first cache state of the plurality of cache states corresponds to the first cache block, the cache control circuit is configured to change the first cache state to a transient state if a change from a current state to a new state is to be performed responsive to the request and performing the change from the current state to the new state includes performing at least a first communication on an interconnect to maintain coherency of the first cache block, and wherein a same transient state is used in response to any request from a local consumer for changing from any current state to any new state if the change includes at least one communication on the interconnect, and wherein the same transient state is used for changing to at least two different new states.

2. The cache as recited in claim 1 wherein the cache control circuit is configured to receive a reply to the first communication, wherein the reply includes an indication of the new state.

3. The cache as recited in claim 2 wherein the cache control circuit is configured to change the first state from the transient state to the new state identified by the reply in response to the reply.

4. The cache as recited in claim 3 wherein the cache control circuit is configured to transmit a second communication on the interconnect subsequent to changing the first state to the new state.

5. A system comprising:
   a local consumer configured to transmit a request to access a first cache block;
   a first cache configured to store a first plurality of cache blocks and to maintain a first plurality of cache states, each of the first plurality of cache states corresponding to a respective one of the first plurality of cache blocks; and
   a second cache configured to store a second plurality of cache blocks and to maintain a second plurality of cache states, each of the second plurality of cache states corresponding to a respective one of the second plurality of cache blocks;
   wherein, if the first cache block is one of the first plurality of cache blocks, a first cache state of the first plurality of cache states corresponds to the first cache block, the first cache is configured to change the first cache state to a transient state if a change from a current state to a new state is to be performed responsive to the request and changing from the current state to the new state includes performing at least a first communication on an interconnect to maintain coherency of the first cache block with at least the second cache, and wherein a same transient state is used for changing from any current state to any new state if the change includes at least one communication on the interconnect, and wherein the same transient state is used for changing to at least two different new states.

6. The system as recited in claim 5 wherein, in response to the first communication from the first cache and if the first cache block is one of the second plurality of cache blocks, the second cache is configured to change a second cache state of the second plurality of cache states that corresponds to the first cache block in the second cache from a current state to a second transient state if the current state is not the second transient state.

7. The system as recited in claim 6 wherein the second cache is configured to transmit a second communication on the interconnect indicating non-acknowledgement of the first communication if the current state is the second transient state.

8. The system as recited in claim 6 wherein, in response to a reply to the first communication from the interconnect that indicates the new state, the first cache is configured to change the first cache state from the transient state to the new state.

9. The system as recited in claim 8 wherein the first cache is further configured to initiate a third communication on the interconnect, and wherein the second cache is configured to change the second cache state out of the second transient state responsive to the third communication.

10. The system as recited in claim 9 wherein the second cache is configured to change the second cache state out of the second transient state to a different state that is dependent on a type of the first communication.

11. The system as recited in claim 9 wherein the second cache is configured to change the second cache state from the second transient state to the transient state responsive to the third communication if the second cache has an outstanding transaction pending for the first cache block.

12. A method comprising:
receiving a request to access a first cache block in a first cache that is configured to store a first plurality of cache blocks and to maintain a first plurality of cache states, each of the first plurality of cache states corresponding to a respective one of the first plurality of cache blocks; and
if the first cache block is one of the first plurality of cache blocks, wherein a first cache state of the first plurality of cache states corresponds to the first cache block, changing the first cache state to a transient state if a change from a current state to a new state is to be performed responsive to the request and performing the change from the current state to the new state includes performing at least a first communication on an interconnect to maintain coherency of the first cache block with at least a second cache, the second cache configured to store a second plurality of cache blocks and to maintain a second plurality of cache states, each of the second plurality of cache states corresponding to a respective one of the second plurality of cache blocks, and wherein a same transient state is used for changing from any current state to any new state if the change includes at least one communication on the interconnect, and wherein the same transient state is used for changing to at least two different new states.

13. The method as recited in claim 12 further comprising initiating the first communication on the interconnect.

14. The method as recited in claim 13 further comprising, in response to the first communication and if the first cache block is one of the second plurality of cache blocks, changing a second cache state of the second plurality of cache states that corresponds to the first cache block in the second cache from a current state to a second transient state if the current state is not the second transient state.

15. The method as recited in claim 14 further comprising transmitting a second communication on the interconnect indicating non-acknowledgement of the first communication if the current state is the second transient state.

16. The method as recited in claim 14 further comprising, in response to a reply to the first communication from the interconnect that indicates the new state, changing the first cache state from the transient state to the new state.

17. The method as recited in claim 16 further comprising:
initiating a third communication on the interconnect; and
changing the second cache state out of the second transient state responsive to the third communication.

18. The method as recited in claim 17 wherein changing the second cache state out of the second transient state comprises changing the second cache state to a different state that is dependent on a type of the first communication.

19. The method as recited in claim 17 wherein changing the second cache state out of the second transient state comprises changing the second cache state to the transient state if the second cache has an outstanding transaction pending for the first cache block.

20. A cache comprising:
a cache memory configured to store a plurality of cache blocks and a plurality of cache states, wherein each of the plurality of cache states corresponds to a respective one of the plurality of cache blocks; and
a cache control circuit coupled to the cache memory, wherein the cache control circuit is configured to implement a cache coherency protocol that includes a plurality of stable states and a transient state, wherein the transient state is used in response to any request from a local consumer if completing the request includes a change between the plurality of stable states and making the change includes transmitting at least a first communication to maintain coherency on an interconnect, and wherein a same transient state is used for changing to at least two different stable states.

21. The cache as recited in claim 20 wherein the cache control circuit is configured to receive a reply to the first communication, wherein the reply includes an indication of the new state.

22. The cache as recited in claim 21 wherein the cache control circuit is configured to change the first state from the transient state to the new state identified by the reply in response to the reply.

23. The cache as recited in claim 22 wherein the cache control circuit is configured to transmit a second communication on the interconnect subsequent to changing the first state to the new state, wherein the second communication indicates that the state change is complete.

24. The cache as recited in claim 23 wherein other caches coupled to the interconnect are configured to change to a global transient state for the first cache block responsive to the first communication on the interconnect, and wherein the other caches are configured to change out of the global transient state for the first cache block responsive to the second communication.

25. A system comprising the local consumer and the cache as recited in claim 20.

26. A system comprising:
a cache configured to store a plurality of cache blocks; and
a controller coupled to the cache, wherein the controller is configured to implement a cache coherency protocol that includes a plurality of stable states and a transient state, wherein the transient state is used in response to any request from a local consumer if completing the request includes a change between the plurality of stable states and making the change includes transmitting at least a first communication to maintain coherency on an interconnect, and wherein a same transient state is used for changing to at least two different stable states.

27. The system as recited in claim 26 wherein the controller comprises a processor configured to execute software, during use, that implements the cache coherency protocol.

28. The system as recited in claim 26 wherein the controller comprises hardware circuitry configured to implement the cache coherency protocol.

29. The system as recited in claim 26 wherein the cache control circuit is configured to receive a reply to the first communication, wherein the reply includes an indication of the new state, and wherein the controller is configured to change the first state from the transient state to the new state identified by the reply in response to the reply.

30. The system as recited in claim 29 wherein the controller is configured to transmit a second communication on the interconnect subsequent to changing the first state to the new state, wherein the second communication indicates that the state change is complete.

31. The system as recited in claim 29 wherein the controller, responsive to receiving a second communication from the interconnect identifying a second cache block of the plurality of cache blocks, is configured to change a second cache state of the plurality of cache states that corresponds to the second cache block to a second transient state.

32. The system as recited in claim 31 wherein the controller, responsive to a third communication from the interconnect, is configured to change the second cache state from the second transient state to a new state.

33. The system as recited in claim 32 wherein the new state is dependent on a type of the second communication.

34. The system as recited in claim 32 wherein the new state is the transient state if the cache has an outstanding transaction pending for the second cache block.

* * * * *